Figure 1:
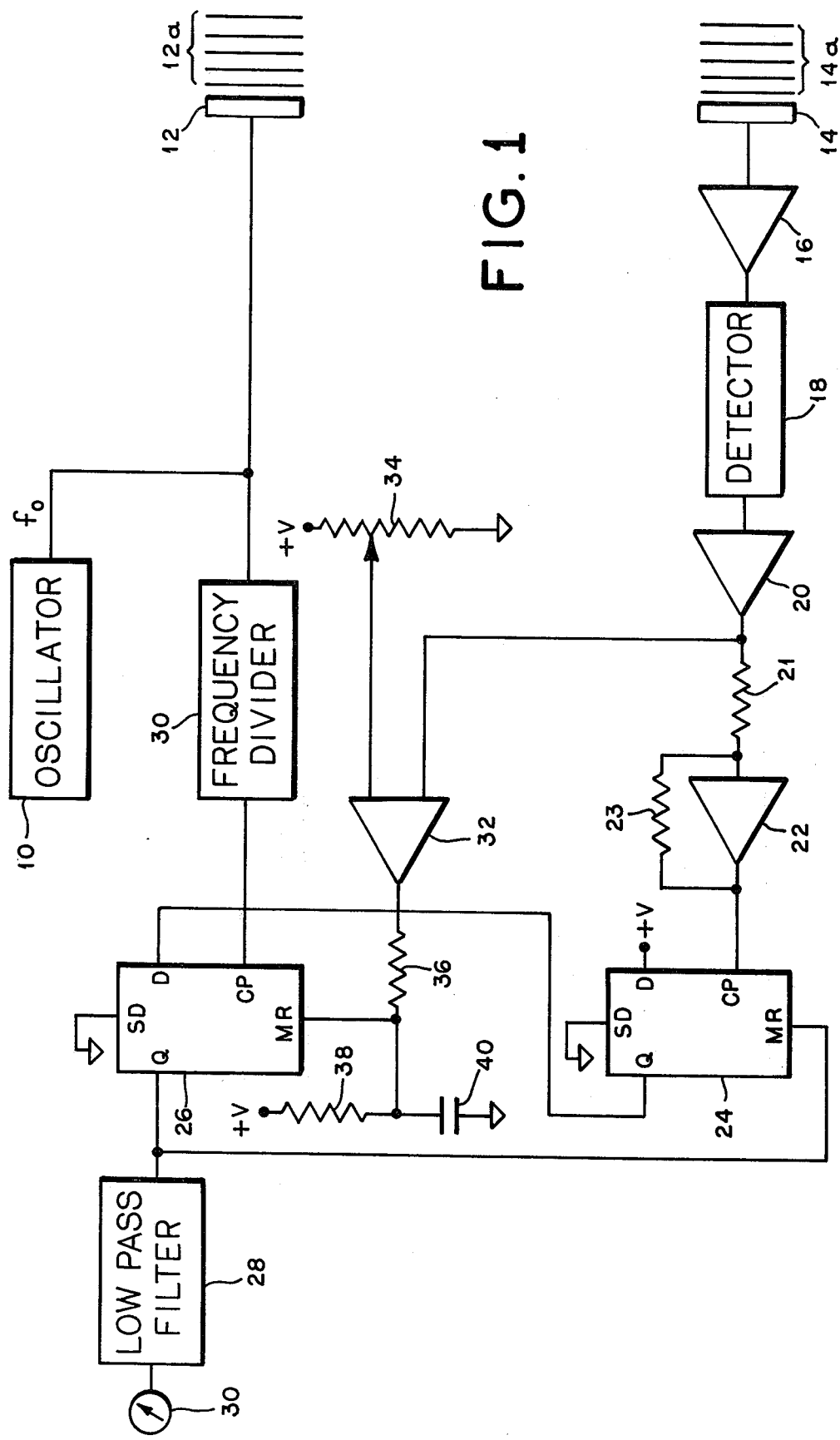

United States Patent [19]

Connery et al.

[11] 4,280,365
[45] Jul. 28, 1981

[54] ULTRASONIC DOPPLER FLOWMETER WITH CORRECTION FOR VIBRATORY SIGNALS AT ZERO-FLOW CONDITIONS

[75] Inventors: James G. Connery, Ambler; Louis D. DiNapoli, Colmar; Giancarlo Punis, Chalfont, all of Pa.

[73] Assignee: Leeds & Northrup Company, North Wales, Pa.

[21] Appl. No.: 83,490

[22] Filed: Oct. 10, 1979

[51] Int. Cl.³ .............................................. G01F 1/66
[52] U.S. Cl. ..................................... 73/861.25; 343/8
[58] Field of Search ................ 73/861.25, 861.18, 629, 73/628; 340/606, 607, 627; 343/8

[56] References Cited

U.S. PATENT DOCUMENTS

| | | | |
|---|---|---|---|
| 2,770,795 | 11/1956 | Peterson | 73/861.25 |
| 2,908,888 | 10/1959 | Kirkland | 73/861.25 |
| 3,443,433 | 5/1969 | Liston | 73/861.25 |
| 3,554,030 | 1/1971 | Peronneau | 73/861.25 |
| 3,741,014 | 6/1973 | Tamura | 73/628 |
| 4,048,853 | 9/1977 | Smith | 73/861.25 |
| 4,183,245 | 1/1980 | Connery et al. | 73/861.25 |

Primary Examiner—Gerald Goldberg
Assistant Examiner—Denis E. Corr
Attorney, Agent, or Firm—Raymond F. MacKay; William G. Miller, Jr.

[57] ABSTRACT

An ultrasonic Doppler flowmeter for measuring flowing fluid by reflection of sonic waves from particles in the fluid is provided with a discriminating circuit including a comparator amplifier connected to the received signal that produces a zero-flow output from the flowmeter when the signal received by the receiving means is produced by vibration of the reflecting particles in a zero-flow condition.

7 Claims, 1 Drawing Figure

ULTRASONIC DOPPLER FLOWMETER WITH CORRECTION FOR VIBRATORY SIGNALS AT ZERO-FLOW CONDITIONS

BACKGROUND OF THE INVENTION

This invention relates to ultrasonic Doppler flowmeters for the measurement of flow of a fluid containing reflectors and more particularly flowmeters having the capability of distinguishing between energy reflected from flowing reflectors and energy reflected from vibrating reflectors under zero-flow condition.

In ultrasonic Dopper flowmeters, an oscillator having a frequency $f_o$ is connected to apply this frequency to an ultrasonic transducer so that a beam of ultrasonic waves is propagated in a flowing fluid at an angle $\theta$ with respect to the direction of the flow. Part of the ultrasonic energy is reflected back to the transducer by air bubbles or particles in the fluid. If all of the reflectors were traveling at the same velocity as the fluid, the frequency of the reflected energy would be shifted from the transmitted frequency $f_o$ by an amount $F_d$ by virtue of the Doppler effect. The quantity $F_d$ is given by the well known equation $$F_d = 2 V_f f_o (\cos \theta / C) \qquad (1)$$

where $V_f$ is the fluid velocity and C is the acoustic velocity in the fluid.

In practice, however, the received signal is not a single frequency but a broad spectrum of frequencies. This spectrum is produced because the particles do not all move at the same velocity, as each particle has a velocity which depends on its radial position in the pipe, and furthermore, the transmitted and received acoustic waves are not plane waves, but exhibit curved phase fronts. The resulting frequency spectrum is usually roughly Gaussian in shape with a half-power width equal to a mean frequency $F_d$.

Another problem that is usually encountered is that the reflectors in the fluid have imparted to them vibrational velocity components in addition to the desired flow velocity component. Such vibrations are usually caused by pumps and other vibration sources. This vibrational velocity component is particularly undesirable when the fluid flow is completely stopped as by means of a valve. Under these circumstances the vibration of the particles produces a Doppler shifted received signal that will provide an indication of flow at the output of the flowmeter, notwithstanding the fact that the flow has been reduced to zero by a valve. In general, the cumulative reflected vibratory signal from the reflectors in the fluid is substantially less in magnitude than the cumulative signal received from particles that are flowing, even though such flowing particles may include a vibrating component. The reason that the signal from vibrating particles is significantly smaller is that the received signal is due to the sum of the signals from each particle and in the vibrating mode, there is a strong tendency for the signals from the individual particles to cancel each other and to thus provide a signal at any frequency of magnitude significantly smaller than the magnitude from normal flowing particles in which the effect of the reflected signals from the flowing particles is additive.

The receiving channel in ultrasonic Doppler flowmeters generally incorporates a zero-crossing detector as an input element in the frequency-to-voltage converter. In order to prevent the zero-crossing detector from being influenced by noise, it is common practice to have a built-in hysteresis in the zero-crossing detector. With hysteresis the zero-crossing detector indicates a crossing only when the signal exceeds the hysteresis threshold level in either a positive or a negative direction.

In order to avoid a zero-flow signal caused by vibrating reflectors, some ultrasonic Doppler flowmeters are provided with a means to reduce the gain of the receiving channel so that the Doppler signal applied to the zero-crossing detector that is produced by the vibrating reflectors in zero-flow conditions is smaller than the hysteresis threshold level of the zero-crossing detector. To accomplish this, the user is instructed to produce a zero-flow condition and to gradually decrease the gain of the receiving channel until the indication from the flowmeter is zero. While this procedure eliminates the zero-flow error, it does introduce error into the flowmeter signal under normal flow conditions. It can be shown mathematically for any given rms level of a signal applied to a zero-crossing detector with hysteresis-threshold that the average frequency of the output will deviate from the input frequency inversely exponentially as the ratio of the hysteresis-threshold to the rms level of the input signal. Thus, using a gain adjustment of the receiving channel to reduce its gain so that there is a correct zero-flow signal introduces errors in the normal operation of the flowmeter by increasing the ratio.

In order to avoid the problems of flowmeter errors associated with reduction in gain of the receiving channel, Applicants have proposed a circuit arrangement using discriminating means to distinguish between a vibratory motion and a flow motion of the fluid particles. This discriminating means includes a comparator amplifier responsive to the amplified received Doppler signal. The threshold level of the comparator amplifier is adjusted under conditions of zero-flow when the Doppler signal from the reflectors in the fluid is due solely to a vibratory mode to cause the frequency-to-voltage converter to be disabled and produce a zero-flow output signal and to enable the frequency-to-voltage converter when the Doppler signal from the reflectors is caused by fluid flow. Such an arrangement avoids the problem of reducing the receiver gain to avoid zero-flow error. When the fluid begins to flow and the received signal exceeds the threshold level of the comparator amplifier, the ratio of the hysteresis to the rms value of the received signal is small to create a minimal error in the reading of the Doppler flowmeter.

An object of this invention is to remove errors in ultrasonic Doppler flowmeters due to zero-flow vibrating particles without increasing errors during normal operation.

Other objects and advantages and features of this invention will become apparent to those skilled in the art without departing from the scope and spirit of this invention, and it should be understood that the latter is not necessarily limited to the above mentioned discussion and drawing in which;

FIG. 1 is a block diagram of an ultrasonic Doppler flowmeter incorporating the invention.

Referring to FIG. 1, there is shown a block diagram of an ultrasonic Doppler flowmeter including an oscillator 10 having an output frequency $f_o$. The output frequency $f_o$ from the oscillator 10 is applied to an ultrasonic transducer 12 for producing a beam of ultrasonic energy 12a. The ultrasonic transducer 12 may be of any well known type, for example, as those manufactured from lead zirconate titanate. The ultrasonic transducer 12 is positioned with respect to a pipe or conduit such that the ultrasonic beam 12a is directed at an angle θ to the direction of flow in the pipe or conduit. Any particles or bubbles in the flowing liquid will reflect a portion of the energy back towards the vicinity of the transmitting transducer 12 as shown as a beam of ultrasonic energy 14a impinging upon an ultrasonic receiving transducer 14. The ultrasonic energy impinging upon the ultrasonic transducer 14 has a frequency that is displaced from the transmitted frequency $f_o$ by an amount dependent upon the rate at which the fluid and its particles and air bubbles is flowing in the conduit or pipe.

The electrical signal from the transducer 14 is applied to the input of a tuned RF amplifier 16 that is tuned to have an optimum amplification in the range of frequencies which will include $f_o$, the transmitted frequency, and include a band of frequencies at least as wide as the frequencies anticipated from the velocity of the fluid that is to be measured. Not only does the ultrasonic transducer 14 apply to the input of the RF amplifier 16, a frequency corresponding to the ultrasonic frequency included in the reflected sonic beam 14a, but it also includes the frequency $f_o$. The signal having the frequency $f_o$ is generally obtained from coupling acoustic or electrical signals from the ultrasonic transducer 12 to the ultrasonic transducer 14. Thus, the output from the RF amplifier 16 includes not only the frequency of the reflected signal, but also includes a signal having the frequency $f_o$ of the transmitted signal. The output signal from the RF amplifier 16 is supplied to the input of an envelope detector 18. The envelope detector 18 produces at its output a signal having a frequency corresponding to the difference between the transmitted frequency $f_o$ and the received reflected frequencies. The difference between these two frequencies is the Doppler frequency $F_d$ from the various particles included in the flowing medium. As the particles in the fluid flow at different velocities dependent upon the location of the particle with respect to the walls of the pipe or conduit, the frequency received includes a spectrum of frequencies. Rather than a single frequency, there is therefore produced at the output of the detector 18, a band of frequencies, roughly Gaussian in shape with a half-power width equal to a mean frequency $F_d$ as defined in Equation (1), which is applied to the input of an audio amplifier 20 and is, in turn, applied through a resistor 21 as an input to the non-inverting terminal of a comparator limiter amplifier 22 which, by virtue of a positive feedback connection through a resistor 23, has a built-in hysteresis-threshold. The limiter 22 produces at its output a substantially square wave which is created by the crossing of the output signal from audio amplifier 20 past the hysteresis-threshold of comparator limiter 22. The frequency of the substantially square wave produced by applying the band of frequencies to a zero-crossing detector having a hysteresis-threshold is defined by the following equation:

$$f' = F_d \cdot e^{-\frac{1}{2}(V_{HDC}/V_s)^2} \quad (2)$$

wherein f' is the output frequency of the square wave signal, $V_{HDC}$ is the DC hysteresis-threshold level, and $V_s$ is the rms level of the signal from audio frequency amplifier 20.

It will be noted from the above equation that the average frequency of the output from the limiter 22 deviates from the Doppler frequency in accordance with the ratio of the hysteresis-threshold to the rms voltage of the signal. Therefore in order to have the frequency output from the limiter 22 accurately follow the mean frequency of the band of Doppler frequencies appearing in the output of detector 18, it is important that the signal level be kept great with respect to the hysteresis-threshold.

The square wave output signal from the comparator limiter 22 is applied to a frequency-to-voltage converter including a pair of D-type flip-flops 24 and 26 and a low-pass filter 28. The D-type flip-flops 24 and 26 may preferably be of the type identified as 4013. Each of these flip-flops has independent data, set, reset, and clock inputs and an output. The logic level present at the data input D is transferred to the output Q during the positive-going transition of a pulse on the clock input CP. Setting or resetting is independent of the clock and is accomplished by a HIGH level on the set or reset line respectively. As shown, the output from the limiter 22 is applied to the clock input CP of flip-flop 24.

Referring to D-type flip-flop 24, the data input D is connected to a positive voltage source +V, the set terminal SD is connected to ground, and the reset terminal MR is connected to the output Q of the flip-flop 26. The output Q from flip-flop 24 is connected to the data input terminal D of flip-flop 26.

While the operation of flip-flops 24 and 26 to produce an output signal at terminal Q of flip-flop 26 that varies in proportion to the Doppler frequency $F_d$ will be apparent to those skilled in the art, our application Ser. No. 953,739 filed Oct. 23, 1978, now U.S. Pat. No. 4,183,245 is incorporated herein by reference to provide a detailed description of the operation of the flip-flops 24 and 26.

It is common in industrial applications to have considerable vibration present in the pipe and fluid whose flow is being measured. Vibrations in a pipe clearly cause the fluid and the particles in the fluid also to vibrate. Thus, the fluid has some vibrational velocity components in addition to the desired axial velocity component. Since the Doppler flowmeter transducer is normally bonded to the pipe, it is subjected to the same vibration, i.e., it is moving in unison with the fluid and the particles, thus the secondary velocity components tend to cancel. While the cancellation is not complete, the relative magnitude of the vibration signal to the flow signal is normally small. Thus, during flow condition, the signal from transducer 14 may be considered as substantially entirely a flow signal.

However, with the flow of the fluid stopped as by the closing of a valve, there will continue to exist from the transducer 14 a frequency signal that is relatively small in magnitude created by the vibratory mode of the reflectors in the fluid.

In order to discriminate between signals received from vibrating reflectors under zero-flow conditions and signals received from reflectors during flow conditions, a discriminating circuit including a comparator amplifier 32 has its inverting input terminal connected to the output from audio frequency amplifier 20 and its non-inverting input connected to the adjustable contact of a potentiometer 34. The resistance element of the potentiometer 34 is connected between a positive voltage source +V and ground or signal common. The comparator amplifier 32 is of the type having an open-collector output stage. This output stage is connected through a resistor 36 to the MR terminal of the flip-flop 26. The terminal MR of the flip-flop 26 is also connected to a common connection between a terminal of a resistor 38 and a terminal of a capacitor 40. The other terminal of the capacitor 40 is connected to ground or signal common and the other terminal of the resistor 38 is connected to a positive voltage supply +V.

During operation, if the positive excursions of the input signal amplified and appearing at the output terminal of audio frequency amplifier 20 do not exceed the voltage level at the contact of potentiometer 34, the output stage of the comparator amplifier 32 remains open and the capacitor 40 charges to the potential of the +V voltage source. Under these conditions the positive voltage appearing at the MR terminal of flip-flop 26 disables the flip-flop 26 and there are no pulses produced at its terminal Q. There is thus produced at the terminal Q of the flip-flop 26 an indication of zero-flow. When the signal appearing at the output of the audio frequency amplifier 20 exceeds the potential appearing at the contact of the potentiometer 34, the open-collector output stage of the comparator amplifier 32 is closed and the capacitor 40 is rapidly discharged through the resistor 36 to ground. This quickly lowers the potential applied to the MR terminal of the flip-flop 26 and permits the flip-flop 26 to operate to produce pulses at its terminal Q. If the output signal from the amplifier 20 drops below the potential appearing at the contact of the potentiometer 34, the output stage of the comparator amplifier 32 opens. The open condition in the output stage of the comparator amplifier 32 permits the capacitor 40 to be charged through the resistor 38 toward the potential of the voltage source +V. Because of the time delay required for the capacitor 40 to charge because of the magnitude of the resistor 38, the voltage appearing at the terminal MR of flip-flop 26 will increase exponentially. In practice, the resistance value is selected such that a time delay occurs before the flip-flop 26 is disabled. This delay prevents temporary low signal conditions from causing the output of the flowmeter to oscillate between a zero-flow indication and a flow indication due to the presence of noise or other signal disturbances.

To adjust the equipment in use so that the discriminating network does, in fact, discriminate between signals from vibrating reflectors and signals from flowing reflectors, the flow is interrupted as by the closing of a valve with the flowmeter in operation, and the contact of the potentiometer 34 is adjusted to the grounded end of the potentiometer resistance to produce zero voltage applied to the input terminal of the comparator amplifier 32. Under these conditions there is no discrimination between the vibrating particles and flowing particles and an output signal will be produced at the output terminal Q of flip-flop 26 indicative of a flow condition, even though there is a closed valve preventing such flow. The operator then slowly adjusts the contact of the potentiometer 34 relative to the potentiometer resistance to gradually increase the voltage applied to the terminal of the comparator amplifier 32. This adjustment is continued until the output appearing at the terminal Q of flip-flop 26 indicates a zero-flow condition, i.e. when the flip-flop 26 is disabled by the voltage applied to its MR terminal. When the valve is then opened and a flow condition exists, the signal received from the flowing particles in the fluid will be of such magnitude that the signal appearing at the output of amplifier 20 will cause the output stage of amplifier 32 to be in a closed condition reducing the voltage applied to terminal MR of flip-flop 26 to a level that enables the flip-flop to produce an output signal indicative of the flow of the flowing particles in the fluid.

While the invention has been described with respect to a particular embodiment, it is to be understood that other circuit arrangements could be used to accomplish the result of eliminating the signals due to vibrating particles in the fluid and other sources of vibrational signals such as vibrations of the ultrasonic transducers relative to the pipe or conduit and the like, and to provide for proper operation in the presence of flowing particles in the fluid without sacrifice of the gain in the receiving channel that can be mathematically shown to produce errors in the frequency of the square waves produced at the terminal Q of the flip-flop 26 and in the flow indication by the meter 30.

What is claimed is:

1. An ultrasonic Doppler flowmeter for measuring the flow of a liquid containing reflectors comprising:

transmitting means for producing in said liquid a wave of ultrasonic vibrations having a component along the axis of said flow;

receiving means for receiving reflected ultrasonic energy from said reflectors in said liquid and producing an electrical output signal having a frequency component related to the rate of motion of said reflectors;

converting means for converting said electrical output signal having said frequency component into a first electrical signal having a magnitude varying in accordance with said frequency component;

indicating means responsive to said magnitude of said first electrical signal for indicating the rate of motion of said reflectors;

discriminating means connected to said receiving means for discriminating between said electrical output signal produced by said receiving means from said reflectors moving in a vibratory mode and said electrical output signal produced by said receiving means from said reflectors moving in a flow mode and producing a second electrical signal having a first characteristic when said reflectors are moving predominately in a vibratory mode and a second characteristic when said reflectors are moving in a flow mode; and means for producing an indication of zero motion on said indicating means when said second electrical signal has said first characteristic.

2. Apparatus as claimed in claim 1 in which said discriminating means is responsive to the magnitude of said electrical output signal from said receiving means.

3. Apparatus as claimed in claim 2 in which said discriminating means includes means for adjusting the magnitude of said electrical output signal from said receiving means at which said second electrical signal produced by said discriminating means will change between said first characteristic and said second characteristic.

4. Apparatus as claimed in claim 1 in which said discriminating means includes means for establishing a time interval between the occurrence of a vibratory mode and the production of said first characteristic of said second electrical signal.

5. Apparatus as claimed in claim 4 in which said means for establishing said time interval is a resistance-capacitance network included in said discriminatory means.

6. Apparatus as claimed in claim 1 in which said converting means includes a flip-flop circuit, having an inhibit terminal, for generating a train of variable frequency pulses and said means for producing an indication of zero motion is a connection between said inhibit terminal of said flip-flop and said second electrical signal of said discriminating means.

7. An ultrasonic Doppler flowmeter for measuring the flow of a liquid containing reflectors comprising:

transmitting means for producing in said liquid a wave of ultrasonic vibrations having a component along the axis of said flow;

receiving means for receiving reflected ultrasonic energy from said reflectors in said liquid and producing an electrical output signal having a frequency component related to the rate of motion of said reflectors;

converting means for converting said electrical output signal having said frequency component into a first electrical signal having a magnitude varying in accordance with said frequency component;

indicating means responsive to said magnitude of said first electrical signal for indicating the rate of motion of said reflectors;

discriminating means connected to said receiving means for discriminating between said electrical output signal produced by said receiving means from vibrations of said reflectors and said electrical output signal produced by said receiving means by flow of said reflectors and producing a second electrical signal indicative of the presence of vibrations of said reflectors, and means for producing an indication of zero motion on said indicating means when said second electrical signal indicates the presence of vibration of said reflectors.

* * * * *